United States Patent Office 3,651,031
Patented Mar. 21, 1972

3,651,031
PREPARATION OF POLYTHIIRANES
Bernard Boucheron, Bethune, France, assignor to Societe Anonyme: Ethylene-Plastique, Paris, France
No Drawing. Filed Dec. 10, 1968, Ser. No. 782,755
Claims priority, application Great Britain, Dec. 14, 1967, 56,849/67
Int. Cl. C08g 23/00
U.S. Cl. 260—79                                   6 Claims

ABSTRACT OF THE DISCLOSURE

Process for the preparation of thermostabilisable polythiiranes in which polymerisation is effected in a polymerisation medium containing or consisting of dimethyl sulfoxide and a catalyst selected from the group consisting of a tetraphenyl phosphonium salt and a tetraalkyl ammonium salt.

---

This invention relates to the preparation of polythiiranes.

Suggestions have previously been made for polymerising thiirane (ethylene sulphide) or various substituted homologues thereof with cationic or anionic catalysts, but most of these processes yield polythiiranes which cannot be thermostabilised and consequently cannot be moulded or formed at elevated temperatures and/or which are very discoloured after melting.

I have studied the conditions under which this polymerisation is carried out (the reaction medium, the catalyst, the temperature, the concentration of catalyst and the method of adding the monomer) and have made the unexpected discovery that if polymerisation is effected in media containing dimethyl sulphoxide (DMSO), the resulting polythiiranes are much more thermostabilisable and much whiter after melting.

According to the present invention, therefore, we provide a process for the production of polythiirane, which comprises polymerising thiirane in the presence of a polymerisation medium containing dimethyl sulphoxide.

This process can also be used to produce copolymers of thiirane with a minor proportion of a substituted homologue of thiirane, such homologues being those in which a hydrogen atom of thiirane is replaced by a hydrocarbon radical; in addition the substituted homologue of thiirane used and the proportion in which it is used must be such that the copolymer obtained is insoluble in the polymerisation medium under the polymerisation conditions employed.

We have also found that other factors may to a limited extent affect the thermostabilisability of the polymers produced. For example, the degree of thermostabilisation has been found to depend not only on the composition of the polymerisation medium, but also on the catalyst, the rate of reaction (which in turn depends upon the temperature, catalyst, and medium, and which should be moderate and controlled) and the method of introducing the monomer. In general, thermostabilisation increases inversely with the apparent density of polymer powder obtained.

It is possible to use DMSO alone as the polymerisation medium, but homogeneous or heterogeneous mixtures of dimethyl sulphoxide with one or more other liquid aprotonic compounds, for example aliphatic and aromatic hydrocarbons or less reactive halogenated derivatives thereof, such as chlorophene; cyclic or non-cyclic ethers, such as diethyl oxide or oxolane; ketones, for example propanone; N,N-dialkyl amides, such as dimethyl formamide; or nitriles, such as acetonitrile, may also be used.

We have found that when the polymerisation is carried out in the presence of one of these other aprotonic liquids but in the absence of DMSO, the resultant polymer cannot be thermostabilised to any substantial degree.

A small quantity of a protonic compound can, if desired, be added to the polymerisation medium as a transfer agent; such a compound affects the mean molecular weight and the molecular distribution of the polymer obtained. It is particularly preferred to add a protonic compound when certain polymerisation initiators, such as trialkylamines, are used. Suitable protonic compounds are, for example, alcohols, thiols and mercaptoalcohols.

In heterogeneous polymerisation media (for example cyclohexane and DMSO), the rate of polymerisation is substantially independent of the precise composition of the medium, since the catalyst and the monomer are almost completely soluble in the DMSO. In this case, the function of the aprotonic solvent is to disperse the polymer particles formed and, in particular, to remove heat.

Homogeneous mixtures of DMSO and an aprotonic solvent are preferred, however, since they enable the dielectric constant of the medium to be varied within wide limits, for example from 2 to approximately 49, so that both more active and less active catalysts can be used.

Especially good results have been obtained with mixtures of DMSO and arene (toluene).

It is preferred to use dimethyl sulphoxide which has been distilled or otherwise purified so that it is free of traces of diethyl sulphide, dimethyl sulphone and the other impurities which may be present in the commercially available product.

Suitable anionic polymerisation catalysts are, for example, the following:

(a) Salts

Hydroxides, alcoholates, phenolates, thiolates (aliphatic or aromatic), mono or dithiocarboxylates, cyanides, thiocyanates, for example carbamates, dithiocarbamates (N-alkylated or otherwise), sulphides and amides of Group Ia metals (Li to Fr), quaternary "onium" compounds in Group Va (N to Sb), for example tetraethyl phosphonium and tetraphenyl phosphonium compounds.

(b) Organometallic derivatives of cations in (a)

Sodium naphthalene, potassium methyl sulphonyl methane, sodium acetamide, tetraethyl ammonium phthalimide, sodium triphenyl methane and butyl lithium.

(c) Trialkyl amines, phosphines, arsines, stibines

It should be noted that the initiating activity of the amines increases in proportion as the nitrogen is more loosely held in the molecule. Thus, trimethylamine initiates the polymerisation more easily than N,N-dimethyl alkylamines, while these in turn initiate more readily than other trialkyl amines.

The catalyst used must satisfy two conditions: Firstly, it should be the salt of an acid (in Broenstedt's sense) with a pK equal to or greater than 0.5 in water, and secondly, it must be a salt, the anion of which does not contain acid groups (in Broenstedt's sense) with a pK greater than or equal to 0.5 in water. This avoids any danger of transfer.

Stability of the polymer obtained is measured by extruding the polymer at 215° C. in a plastograph according to the procedure of ASTM D1238–57 T. This test gives the time during which the viscosimetric molecular weight remains constant, which is the stability period.

Two types of polymer stability can be defined: firstly the intrinsic stability (of the crude product): and secondly the stability after dispersion therein of a stabiliser.

We have found that sometimes these two types of stability cannot conveniently be measured at the same time because no flow steps are observed in the plastograph. We have also found that there is no relation between the two types of stability, i.e. an intrinsically stable polymer may not be stabilisable, and vice versa.

Polymers and copolymers of thiirane prepared by the process of this invention may be stabilised by the addition thereto of the nitrogenous compounds described in Belgian patent specification No. 645,691. The freshly-prepared polymer powder is moistened with a solution of the nitrogenous compound in a suitable liquid, for example, water or an alcohol or amine. The resulting paste is dried and the dry polymer powder is homogenised in order to disperse the stabiliser.

The preferred catalysts and polymerisation media for use in the process according to the invention are as follows, in order of decreasing preference:

(1) Tetraphenyl phosphonium salts in a DMSO+arene medium, more particularly tetraphenyl phosphonium oleate in a toluene —DMSO medium (approximately 3:1 parts).

(2) Trialkyl amines in a DMSO+arene medium. Amines with "loosely held" nitrogen, for example trimethyl or N,N-dimethyl alkyl amines, are preferred since they initiate more easily.

In particular, N,N-dimethyl dodecylamine in a toluene-DMSO medium (approximately 3:1 parts) gives excellent results.

(3) Tetraphenyl phosphonium or tetra-alkylonium salts in an alkane+DMSO medium. The tetraphenyl phosphonium cation is preferred, more particularly tetraphenyl phosphonium oleate and tetraethyl ammonium oxalate in a cyclohexane or industrial pentane—DMSO medium.

(4) Alkali metal or tetra-alkyl "onium" salts in a DMSO medium, more particularly sodium hydroxide.

All the salts previously mentioned are defined in a broad sense and include alcoholates, carboxylates, thiolates, hydroxides and similar compounds.

The following examples are given by way of illustration only, the melting points reported were measured on the heating stage of a microscope operating with polarised light.

EXAMPLE 1

100 ml. dimethyl sulphoxide and 0.5 mM. (millimoles) tetraphenyl phosphonium oleate were introduced into a 2-litre glass reactor provided with a mechanical stainless steel stirrer and containing an oxygen- and water-free nitrogen atmosphere. 100 g. of thiirane, dissolved in 1.2 litres dimethyl sulphoxide, were then slowly added. Polymerisation began immediately. The monomer was added over a period of an hour, the temperature being kept at 40° C. Stirring was continued for a further 2 hours, whilst the temperature was allowed to decrease. The polymer was then filtered off, washed in methanol, subjected to steam distillation and dried in vacuo at 80° C. 96 g. polythiirane were obtained with a melting point between 203° and 207° C. This polymer was stable for 4 minutes when pure and for 84 minutes after mixing with 2.5% 3,3'-bis(ethylenediamino)-propionamide. The powder had a density of 210 g./l.

EXAMPLE 2

The same apparatus was used as in Example 1.

20 ml. of a mixture of 3 volumes toluene, 1 volume dimethyl sulphoxide, and 0.5 mM. tetraphenyl phosphonium oleate were introduced into the reactor. 100 g. of thiirane in solution in 1 litre of the same mixture of toluene and dimethyl sulphoxide were then added little by little. The reaction started immediately. The thiirane was added over a period of one hour and the temperature kept at 40° C. for 5 hours.

The polymer was then filtered, washed in methanol, and dried at 80° C. in vacuo. 90 g. polythiirane were obtained, melting between 205° and 208° C. The powder had a density of 110 g./l.

In the as-produced form, the polymer had little stability and its intrinsic stability, as defined above, could not be measured. When stabilised as in Example 1, the polymer was stable for 65 minutes and was a yellowy-grey colour.

EXAMPLE 3

The same apparatus was used as in Example 1. 100 ml. of the same mixture of toluene and dimethyl sulphoxide as used in Example 2 mixed with 2.5 mM. of N,N-dimethyl dodecylamine were introduced into the reactor. 500 g. thiirane, dissolved in 5 litres of the same mixture of toluene and dimethyl sulphoxide, were then added. Polymerisation began immediately and the temperature rose to 40° to 45° C., at which it was maintained for 5 hours. The polymer formed was then separated, washed in methanol and dried in vacuo at 80° C. 490 g. polythiirane were obtained, with a melting point between 205° and 208° C. The powder had a density of 120 g./l.

In the as-produced form, the polymer had little stability and its intrinsic stability could not be measured; it was ivory-coloured after extrusion. When stabilised as in Example 1, it was stable for 64 minutes and was a pale yellow colour after extrusion.

EXAMPLE 4

The same apparatus was used as in Example 1. 500 ml. cyclohexane, 200 ml. dimethyl sulphoxide and 0.5 mM. tetraphenyl phosphonium oleate were introduced into the reactor. The mixture was stirred to disperse the insoluble sulphoxide in the alkane, and 100 g. thiirane were added gradually over a period of 30 minutes. Polymerisation started immediately and the temperature was kept between 30° and 40° C. During the next 5 hours, the temperature was allowed to return to ambient temperature. The polymer was filtered, washed in methanol and dried under reduced pressure at 85° C.

90 g. polythiirane were obtained, melting between 204° and 207° C. and the powder had a density of 220 g./l.

In the pure state, the polymer was stable for 2 minutes and was yellow coloured after extrusion. When stabilised as in Example 1, it was stable for 47 minutes and was yellow coloured after extrusion.

EXAMPLE 5

The procedure followed was the same as in Example 4 except that the cyclohexane was replaced by carefully dehydrated industrial pentane and 0.5 mM. tetraethyl ammonium oxalate dissolved in dimethyl sulphoxide was used. The monomer was added over a period of 1 hour 30 minutes, and the temperature was kept at 20° to 25° C. The mixture was stirred for two hours and left to stand overnight. The polymer was collected and processed as in Example 1. 95 g. polythiirane were obtained melting between 202° and 206° C. and the powder had a density of 320 g./l.

In the pure state, the polymer was stable for 10 minutes and had a light chestnut colour after extrusion. When stabilised as in Example 1, it was stable for 34 minutes and was light yellow after extrusion.

EXAMPLE 6

A few millilitres of concentrated aqueous caustic soda solution were poured into dimethyl sulphoxide. The homogeneous mixture was then distilled to remove most of the water, leaving a solution of 23.6 mM. sodium hydroxide in the dimethyl sulphoxide. The process was then continued in the same apparatus as described in Example 1. 22.2 ml. of the catalytic solution described were introduced into the reactor with 200 ml. dimethyl sulphoxide and the whole mixture was kept at 60° C. 100 g. of thiirane dissolved in 300 ml. dimethyl sulphoxide were then added over a period of 2 hours.

Polymerisation started immediately and the mixture was kept at 60° C. for 2 hours. The polymer was then washed with methanol. It was then filtered off and dried in vacuo at 90° C.

98 g. polythiirane were obtained, melting at 207°–209° C. and the powder had a density of 180 g./l.

In the as-produced state, the polymer was stable for 4 minutes and was white after extrusion. After stabilisation, it was extruded in 50 minutes and became grey.

The stability period could not be determined, but Example 5 can be used for comparison. The polymer in Example 5 was stable for 34 minutes and its extrusion period was 44 minutes. This indicates that the polythiirane in Example 6 has a virtual stability of 38 minutes.

EXAMPLE 7

100 ml. dimethyl sulphoxide and 10 g. thiirane were introduced into a 500 ml. reactor similar to that of Example 1. The mixture was stirred for 5 days at 40° C. and as there was no sign of polymerisation, stirring was continued for 20 days at ambient temperature. 5 g. of thiirane oligomers were then separated, melting between 119° and 120° C.

EXAMPLE 8

The process of Example 7 was repeated using 50 ml. toluene, 5 g. thiirane and 0.05 mM. tetraphenyl phosphonium oleate. After the materials had been left together for 180 hours at ambient temperature, and for 26 hours at 40° C., only traces of thiirane oligomers were obtained.

EXAMPLE 9

200 ml. thiirane and 0.2 ml. of a 0.5 M solution of N,N-dimethyl dodecylamine in cyclohexane were introduced into a reactor similar to that of Example 7. The mixture was left to polymerise for 66 hours at ambient temperature. 64 g. polythiirane were obtained, melting between 201° and 204° C. This polymer, both in the as-produced state and after stabilisation, was unstable.

EXAMPLE 10

The same procedure as in Example 1 was followed, with 1 litre of toluene, 100 g. thiirane and 2mM. tetraethyl ammonium oleate.

100 g. thiirane were obtained, melting at 205° to 208° C. and with a stability of less than 3 minutes, before and after stabilisation.

EXAMPLE 11

A mixture consisting of 100 ml. pure dimethyl sulphoxide and 5 mM. of tributylamine was heated to and maintained at 40° C. 10 ml. of pure thiirane were added and initiation took place one minute later. A solution of 140 ml. thiirane in 1400 ml. of an 85/15 by volume mixture of toluene and sulphoxide mixture was then added gradually. Polymerisation was carried out in the normal manner, by stirring and keeping the temperature between 40° and 45° C., for 2 hours. The mixture was then left without stirring overnight at 40° C.

141 g. polythiirane were obtained, melting at approximately 203° C. and with an apparent density of 200 g./l.

The polymer was unstable in the as-produced state, but was stable after addition of a stabiliser (as in Example 1) for 1 hour 37 minutes; it had a yellow colour.

I claim:

1. A process for the production of thermostabilisable thiirane polymers and copolymers of thiirane with a minor proportion of a homologue of thiirane a hydrogen atom of which is replaced by a hydrocarbon radical, which comprises polymerizing thiirane alone or with a minor proportion of said homologue in the presence of a polymerization medium containing dimethyl sulfoxide and a catalyst selected from the group consisting of a tetraphenyl phosphonium salt, and a tetraalkyl ammonium salt.

2. The process of claim 1, wherein thiirane is polymerized.

3. A process according to claim 1, wherein the polymerization medium consists of dimethyl sulfoxide and said catalyst.

4. A process according to claim 1, wherein the polymerization medium also contains at least one other liquid aprotonic compound selected from the group consisting of an aliphatic hydrocarbon, an aromatic hydrocarbon, an ether, a hetone, an N,N-dialkyl amide, and a nitrile, the dimethyl sulfoxide constituting at least 10% by volume of the polymerization medium.

5. The process of claim 1 wherein the catalyst is a tetraphenyl phosphonium salt.

6. The process of claim 1 wherein the catalyst is a tetraalkyl ammonium salt.

References Cited

UNITED STATES PATENTS

| | | | |
|---|---|---|---|
| 3,300,454 | 1/1967 | Osborn | 260—79.7 |
| 3,317,489 | 5/1967 | Sander | 260—79 |
| 3,317,919 | 5/1967 | Sander | 260—79 |
| 3,317,920 | 5/1967 | Sander | 260—79 |
| 3,359,248 | 12/1967 | Osborn et al. | 260—79.7 |
| 3,365,431 | 1/1968 | Gobran et al. | 260—79.7 |
| 3,448,091 | 1/1969 | Gobran et al. | 260—79 |
| 3,472,821 | 10/1969 | Osborn | 260—79 |
| 3,519,606 | 7/1970 | Conciatori | 260—79 |

OTHER REFERENCES

Dermer, Copolymers of Olefin Sulfides, Armed Forces Technical Information Agency, Astia Document No. AD 110496, June 1956, pages (cover) and 10 to 13.

MAURICE J. WELSH, JR., Primary Examiner

M. J. MARQUIS, Assistant Examiner

U.S. Cl. X.R.

260—18 R, 45.9 R, 79.7